US012381314B2

(12) United States Patent
Blennius et al.

(10) Patent No.: US 12,381,314 B2
(45) Date of Patent: Aug. 5, 2025

(54) ANTENNA PLATFORM ARRANGEMENT

(71) Applicant: SAAB AB, Linköping (SE)

(72) Inventors: Martin Blennius, Kullavik (SE); Daniel Bäck, Stenungsund (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 18/869,497

(22) PCT Filed: Jun. 2, 2023

(86) PCT No.: PCT/SE2023/050548
§ 371 (c)(1),
(2) Date: Nov. 26, 2024

(87) PCT Pub. No.: WO2023/234842
PCT Pub. Date: Dec. 7, 2023

(65) Prior Publication Data

US 2025/0167442 A1 May 22, 2025

(30) Foreign Application Priority Data

Jun. 3, 2022 (SE) .................................. 2200060-8

(51) Int. Cl.
*H01Q 1/28* (2006.01)
*H01Q 3/10* (2006.01)
*H01Q 1/32* (2006.01)
*H01Q 1/34* (2006.01)

(52) U.S. Cl.
CPC ................ *H01Q 3/10* (2013.01); *H01Q 1/28* (2013.01); *H01Q 1/32* (2013.01); *H01Q 1/34* (2013.01)

(58) Field of Classification Search
CPC ............... H01Q 3/10; H01Q 1/28; H01Q 1/32
See application file for complete search history.

(56) References Cited

U.S. PATENT DOCUMENTS 3,945,015 A 3/1976 Gueguen
4,078,441 A 3/1978 Mazur
2011/0234464 A1 9/2011 Hall
2021/0249767 A1 * 8/2021 Greenwood ......... H01Q 21/061

FOREIGN PATENT DOCUMENTS

WO WO 9840761 A1 9/1998

OTHER PUBLICATIONS

International Search Report and Written Opinion for Patent Cooperation Treaty Application No. PCT/SE2023/050548, dated Jun. 29, 2023, 8 pages.
Swedish Search Report for Patent Application No. 2200060-8, dated Dec. 7, 2022, 2 pages.

* cited by examiner

*Primary Examiner* — Awat M Salih
(74) *Attorney, Agent, or Firm* — Alston & Bird LLP

(57) ABSTRACT

The present disclosure relates to an antenna platform arrangement (1) comprising a movable antenna plate (2) having an antenna surface (3) and an opposing connection surface (4), a fixed base (5) and a connection means (6) connecting the connection surface (4) and the fixed base (5). Moreover, the movable antenna plate (2) being associated with an apex (c0') of a conical space (c0) being in-between said fixed base (5) and said movable antenna plate (2), wherein said connection means (6) is configured to selectively control said movable antenna plate (2) about said conical space (c0), to a pre-determined maximum angle (α) relative a first plane (x1) being parallel with said fixed base (5).

14 Claims, 6 Drawing Sheets

ANTENNA PLATFORM ARRANGEMENT

CROSS REFERENCE TO RELATED APPLICATIONS

This application is a National Stage Application, filed under 35 U.S.C. § 371, of International Application No. PCT/SE2023/050548, filed Jun. 2, 2023, which international application claims priority to and the benefit of Swedish Application No. 2200060-8, filed Jun. 3, 2022; the contents of both of which as are hereby incorporated by reference in their entireties.

TECHNICAL FIELD

The present disclosure relates to an antenna platform arrangement, a vehicle comprising an antenna platform arrangement and a fixed installation comprising an antenna platform arrangement.

BACKGROUND ART

Antennas, specifically AESA antennas mounted to e.g., antenna platforms of vehicles or base stations may provide control of antenna lobes, often by electronic control. To achieve control of the antenna angles efficiently, there are requirements of sufficient control of the steering as well as a solution that is robust to external conditions such as vibrations or other factors influenced by the environment of the antenna. Consequently, to fulfil said requirements, there may be several components being in direct connection with the antenna, leading to that the mass of the antenna platform arrangement increases which in turn sets great demands on the mechanical devices that are to perform the mechanical steering of the antenna device.

The antenna platform arrangements in the present art fail to fulfil the requirements of being efficient in operation while being robust and convenient to manufacture. The current antenna platform arrangements usually compensate robustness with increased weight and complex design, or vice versa.

Thus, there is room for antenna platforms in the present art to explore the domain of providing an antenna platform arrangement that is improved in operation, robustness and manufacturing. Specifically, there is room in the present art of improving the antenna platforms so that the antenna platforms can be angularly adjusted in a flexible manner while also being robust and convenient to manufacture.

Thus, even though previous solutions may work well in some situations it would be desirable to provide an antenna platform arrangement that address requirements related to improving operation, robustness and the manufacturing of antenna platform arrangements, hence there is still a need for further improvements.

SUMMARY

It is therefore an object of the present disclosure to provide an antenna platform arrangement, a vehicle and a fixed installation comprising such an antenna platform arrangement to mitigate, alleviate or eliminate one or more of the above-identified deficiencies and disadvantages.

This object is achieved by means of providing an antenna platform arrangement, a vehicle and a fixed installation as defined in the appended claims.

The present disclosure relates to an antenna platform arrangement comprising a movable antenna plate having an antenna surface and an opposing connection surface. Further comprising a fixed base and a connection means connecting the connection surface and the fixed base. Further, the movable antenna plate (or specifically the connection surface thereof) is associated with an apex of a conical space being in-between said fixed base and said movable antenna plate. Moreover, said connection means is configured to selectively control said movable antenna plate (or specifically said connection surface) about said conical space, to a pre-determined maximum angle relative a first plane being parallel with said fixed base. The apex may be intersecting said movable antenna plate.

An advantage of the antenna platform arrangement according to the present disclosure is that it is a robust structure that can control an antenna array completely within a sub-spherical area. In other words, a pointing direction of each antenna element of an antenna arrangement thereon is able to follow the contour of a sub-sphere. Further, the arrangement maintains compact structure while providing the benefits of flexible control.

The connection means may comprise a shaft comprising a first and a second joint at opposing first ends thereof, at least one of the joints having two degrees of freedom and the other joint having at least one degree of freedom. Further, the connection means may comprise three rods, each rod comprising a spherical bearing at a rod end, and a mechanical joint at an opposing end thereof. Furthermore, comprising at least a first actuating means connected to one of the shaft and the movable antenna plate wherein the shaft extends between respective central portions of said fixed base and said movable antenna plate, the first joint being connected to the movable antenna plate and the second joint being connected to the fixed base. The actuating means being arranged to translate movement to said shaft and/or said movable antenna plate.

The connection means provide the advantage of providing a flexible movement of the antenna plate with few components and a compact robust structure. Thus, allowing for a cost-efficient antenna platform arrangement while maintaining robustness. Specifically, regarding robustness, the shaft is arranged so that any torque is absorbed by the shaft and linear loads (transverse and length loads) are absorbed by said rods. Thus, external forces are distributed in a sufficient manner to extend the lifetime and robustness of the antenna platform arrangement. Further, the connection means allow for any antenna elements to be prevented from rotating around a pointing direction thereof, thus maintaining flexibility while being robust.

The rod end of each rod may be connected to said central portion of said movable antenna plate jointly surrounding a corresponding first joint of said shaft. Further, the opposing ends of each rods may be connected to edge portions of said fixed base jointly surrounding a corresponding second joint of said shaft. Such a connection of the rods to the antenna plate and fixed base allow for the antenna platform arrangement to be able to withstand mechanical stress to a greater degree—thus increasing robustness.

The first actuating means may be a linear actuator or a coordinate table being arranged in parallel with said fixed base. The coordinate table may be an X-Y coordinate table. Any actuating means of the present disclosure may comprise a motor being of hydraulic type, pneumatic type of electric type so that the motor can provide movement to the actuating means.

A benefit of having a coordinate table as an actuating means is that it allows for an even further compact but yet robust structure.

The coordinate table may comprise a first driving means and a second driving means, the first and the second driving means being arranged to move linearly, perpendicularly relative each other. The first driving means may move along a first rail which may be provided on said fixed base and the second driving means may move along a second rail which may be provided on a driving surface positioned on said first driving means. In other words, the rails may be arranged perpendicularly relative each other. The movement of the first and second driving means may be independently of each other, so that the coordinate table is arranged to by joint movement of said first and second driving means allow for control of said movable antenna plate about said conical space allowing antenna surface to have a pointing direction contouring a sub-spherical area. Each driving means may comprise a motor respectively. The shaft may be connected to a cavity in said coordinate table.

In some aspects the antenna arrangement may further comprise a second actuating means, the first and second actuating means being coupled to a socket slidably connected to said shaft (i.e. arranged to move/slide along the length of the shaft) and wherein the first and the second actuating means are configured to jointly reciprocate, thereby controlling the movable antenna plate about said conical space so to allowing the antenna surface to have a pointing direction contouring a sub-spherical area.

The at least one actuating means may extend along a common plane (in other words, parallel with) as a base surface of the fixed base arranged to provide movement along said base surface.

The shaft may be a cardan shaft, wherein at least one of the joints is a cardan joint, preferably, the first and the second joints are cardan joints. Thus, allowing for a cost-efficient but yet flexible connection.

Further, each of the rods may be attached, at said rod end, to an inner perimeter portion of said movable antenna plate and, at said opposing end to an outer perimeter portion on said fixed base, wherein at least two of the rods are spaced apart by an arc angle of 90-150 degrees, preferably 120 degrees. Such a geometrical connection resulting in increased robustness while maintaining flexibility and function.

The pre-determined maximum angle may be 20-40 degrees, preferably 25-35 degrees. Increasing the functionality of the antenna array that is to be controlled/steered.

The antenna platform arrangement may comprise control circuitry configured to:

- receive a desired position of said movable antenna plate about said conical space;
- control said connection means to move the movable plate to said desired position.

The desired angle may be based on a desired pointing direction of said antenna surface or the antenna array (which may be an AESA antenna) thereon.

There is also provided a vehicle comprising the antenna platform arrangement of any aspect herein and a fixed installation comprising the antenna platform arrangement of any aspect 5 herein. The vehicle may be a ground vehicle, a ship or an airborne vehicle. The fixed installation may be a base station.

BRIEF DESCRIPTION OF THE DRAWINGS

In the following, the disclosure will be described in a non-limiting way and in more detail with reference to exemplary embodiments illustrated in the enclosed drawings, in which.

DETAILED DESCRIPTION

Figure 1:
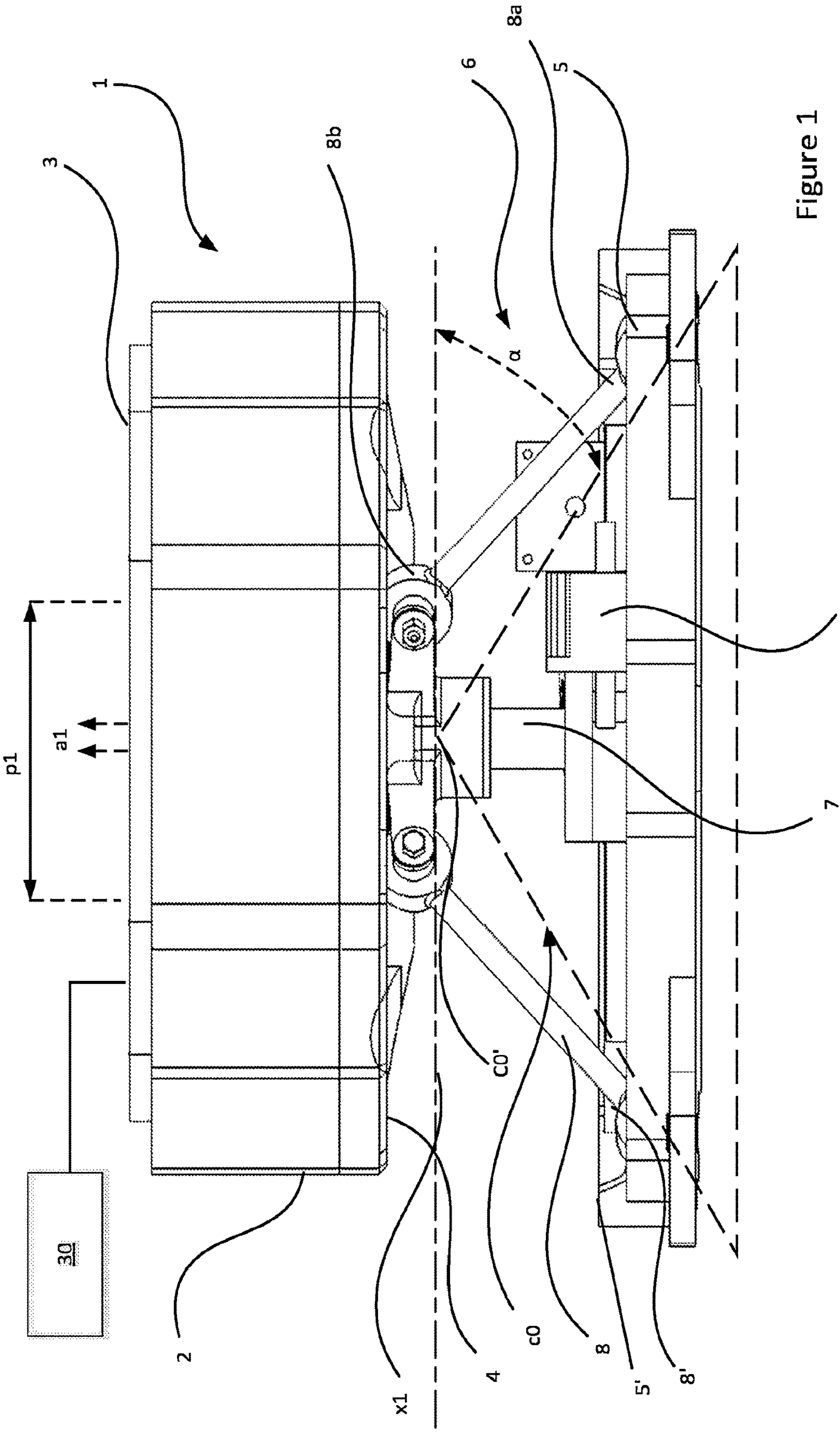
FIG. 1 illustrates from a side view an antenna platform arrangement.

In the following detailed description, some embodiments of the present disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the provided disclosure, it will be apparent to one skilled in the art that the embodiments in the present disclosure may be realized without these details. In other instances, well known constructions or functions are not described in detail, so as not to obscure the present disclosure.

In the following description of example embodiments, the same reference numerals denote the same or similar components.

FIG. 1 illustrates a side view of an antenna platform arrangement 1 comprising a movable antenna plate 2 having an antenna surface 3 and an opposing connection surface 4, a fixed base 5 and a connection means 6 connecting the connection surface 4 and the fixed base 5.

The movable antenna plate 2 (or specifically in some aspects, the connection surface 4) being associated with an apex c0' of a conical space c0 being in-between said fixed base 5 and said movable antenna plate 2. The connection means 6 is configured to selectively control said movable antenna plate 2 (or the connection surface 4) about said conical space c0, to a pre-determined maximum angle a relative a first plane x1 being parallel with said fixed base 5. The pre-determined maximum angle $\alpha$ is 20-40 degrees, preferably 25-35 degrees.

FIG. 1 illustrates that the apex c0' of said conical space c0 is connected/associated to a centre of said antenna plate 2 (or said connection surface 4) of said antenna plate 2. The antenna plate 2 may move so that a pointing direction a1 of said antenna surface 3 or antenna elements thereon form a sub-spherical contour. The conical space c0 may be defined by having a three-dimensional shape that extends from a base to an apex c0'. The antenna surface 3 may comprise an active electronically scanned antenna array, AESA antenna array. The connection means 6, as noted herein, is configured to selectively control said movable antenna plate 2 (or the connection surface 4) about said conical space c0. In other words, the connection surface 4 may follow the contour of a cone co when moved. Said movement being provided by said connection means 6.

Figure 2:
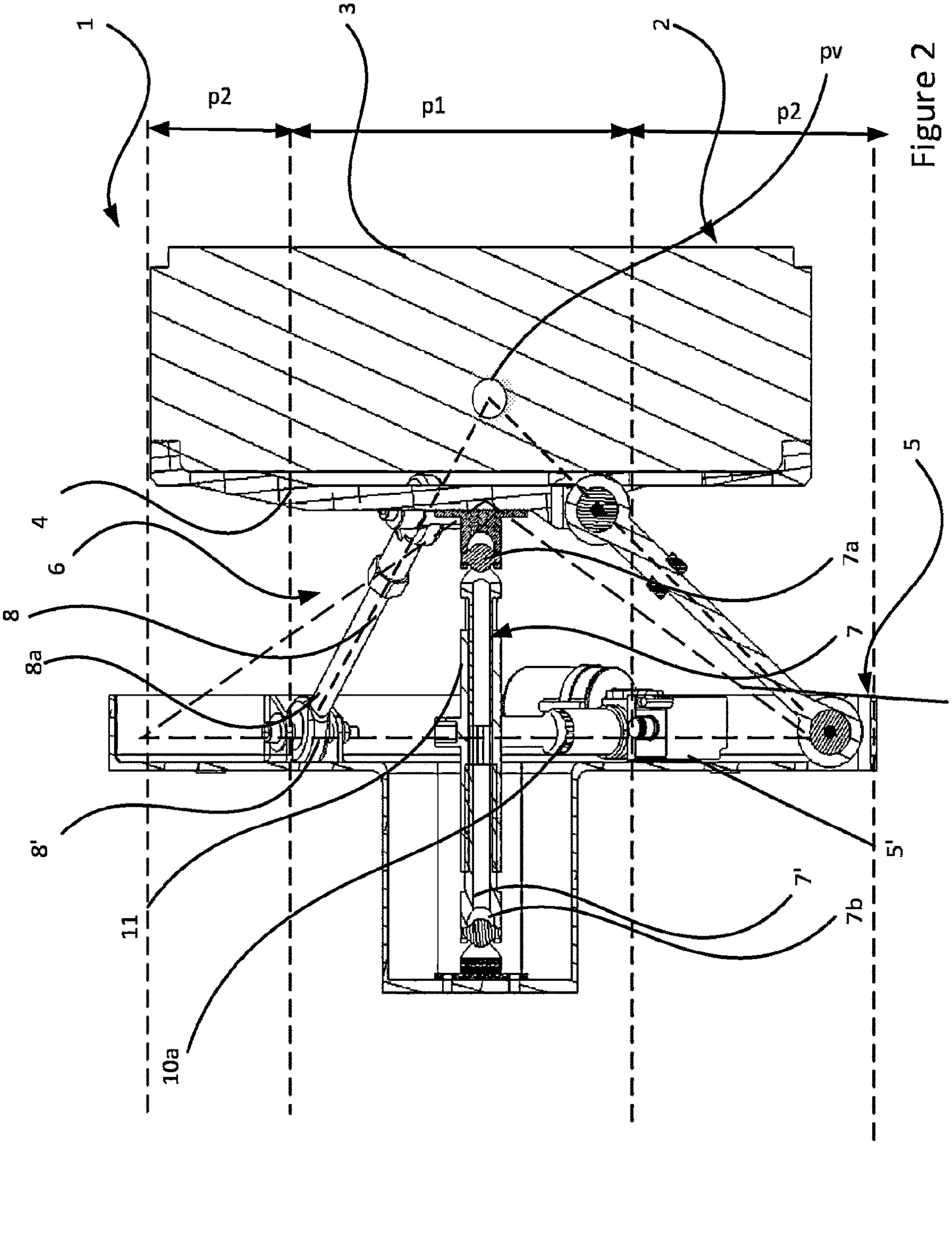
FIG. 2 illustrates from a cross-sectional side view an antenna platform arrangement in accordance with aspects herein.

FIG. 2 illustrates a side cross-sectional view of said antenna platform arrangement 1 that the connection means 6 may comprise a shaft 7 comprising a first and a second joint 7*a*, 7*b* at opposing first ends 7' thereof. Further, at least one of the joints 7*a*, 7*b* has two degrees of freedom and the other joint having at least one degree of freedom. In some aspects both joints 7*a*, 7*b* have two degrees of freedom. Further, the connection means 6 comprises three rods 8, each rod 8 comprising a spherical bearing 8' at a rod end 8*a*, and a mechanical joint at an opposing end thereof 8*b*. In some aspects the spherical bearing and the mechanical joint may be connected in an opposite way. The spherical bearing may be a ball joint, heim joint, a spherical roller bearing or any other suitable type of spherical bearing. The mechanical joint may be a spherical bearing or a bushing joint or a rubber bushing joint or any other suitable type of joint. Further, the connection means 6 may comprise at least a first actuating means 10 (which may be driven pneumatically, electrically or hydraulically) connected to at least one of the shaft 7 and the movable antenna plate 2. As shown in FIG. 2, the shaft 7 may extend between respective central portions p1 of said fixed base 5 and said movable antenna plate 2, the first joint 7*a* being connected to the movable antenna plate 2 and the second joint 7*b* being connected to the fixed base 5.

Referring now, back to FIG. 1, FIG. 1 further illustrates that the antenna platform arrangement 1 further may comprise control circuitry 30 configured to receive a desired position of said movable antenna plate 2 about said conical space c1, and control said connection means 6 to move the movable plate 2 to said desired position. In other words, adjusting the pointing direction a1 of said movable plate 2. The control circuitry 30 may comprise one or more memory devices (not shown). The memory device may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by each associated control circuitry 30. Each memory device may store any suitable instructions, data or information, including a computer program, software, an application including one or more of logic, rules, code, tables, etc. and/or other instructions capable of being executed by the control circuitry 30 and, utilized. In some embodiments, each control circuitry 30 and each memory device may be integrated The control circuitry 30 may include, for example, one or more central processing units (CPUs), graphics processing units (GPUs) dedicated to performing calculations, and/or other processing devices.

The instructions which may be executed by the control circuitry 30 may comprise instructions for operating said antenna platform arrangement 1 according to any aspects of the present disclosure e.g., to control said antenna platform arrangement 1 to have a desired pointing direction a1 of said movable antenna plate 2.

FIG. 2 further illustrates that the rod end 8*a* of each rod 8 is connected to said central portion p1 of said movable antenna plate 2 jointly surrounding a corresponding first joint 7*a* of said shaft 7. Moreover, the opposing end of each rods 8 is connected to edge portions p2 of said fixed base jointly surrounding a corresponding second joint 7*b* of said shaft 7. In FIG. 2 the antenna platform arrangement comprises three rods (in which only two are visible). Further, FIG. 2 illustrates that the at least first actuating means 10 may be a linear actuator 10*a* that is arranged in parallel with said base 5 i.e. extending along the first plane x1 (see FIG. 1). Further, FIG. 2 illustrates that the first actuating means 10 comprises a first and second linear actuator 10*a* (only one linear actuator is seen in FIG. 2) being coupled to a socket 11 slidably connected to said shaft 7. Thus, the first and second linear actuator 10*a* may both be connected to said socket 11, thereby jointly reciprocating the socket 11 along a length of said shaft 7. That movement will allow, depending on the joint reciprocation of the first and second linear actuator 10*a*, the movable antenna plate 2 to be controlled to different positions about the conical space c1 (shown in FIG. 1). To be specific, the linear actuators 10*a* move along the fixed base 5, translating the movement to the shaft 7 through the socket 11, and the shaft 7 together with the rods 8 allow the movable antenna plate to move about said conical space c0. Thus, the linear actuator 10*a* may extend along a common plane x1 (shown in FIG. 1) as a base surface 5' of the fixed base 5 arranged to provide movement along said base surface 5'.

Moreover, FIG. 2 illustrates that the shaft 7 is a cardan shaft, having cardan joints 7*a*, 7*b*. However, in some aspects only one joint is a cardan joint.

FIG. 2 further illustrates that intersections between axial extensions of the rods 8 form a pivot point pv defined by the intersection thereof, wherein the arrangement in FIG. 2 is positioned intermediate the antenna surface 3 and the opposing connection surface 4. However, in some aspects the pivot point pv may be (by adjusting rod 8 length) be positioned otherwise, e.g. at the connection surface 4. An advantage of having the pivot point between the connection surface 4 and the antenna surface 3 is that it allows the movable antenna plate 2 to occupy as little space as possible during its movement about the conical space c0. The pivot point may be the point in which the movable antenna plate 2 rotates around (centre of rotation). Thus, the movable antenna plate 2 may rotate around said pivot point pv and thereby move about said conical space c0. The phrase "move about" may refer to that the antenna plate 2 do not intersect said conical space c0 when being moved—thus its movement allows for the contour of the conical space c0 to be formed/followed. In some aspects the pivot point pv is positioned at the shaft 7, then the shaft 7 may be coupled to a socket that is configured to adjust the shaft 7 axially. In some aspects herein, the conical space co may be defined by said rod 8 extension (towards the antenna plate 2), wherein the apex c0' is defined by said pivot point pv.

Figure 3:
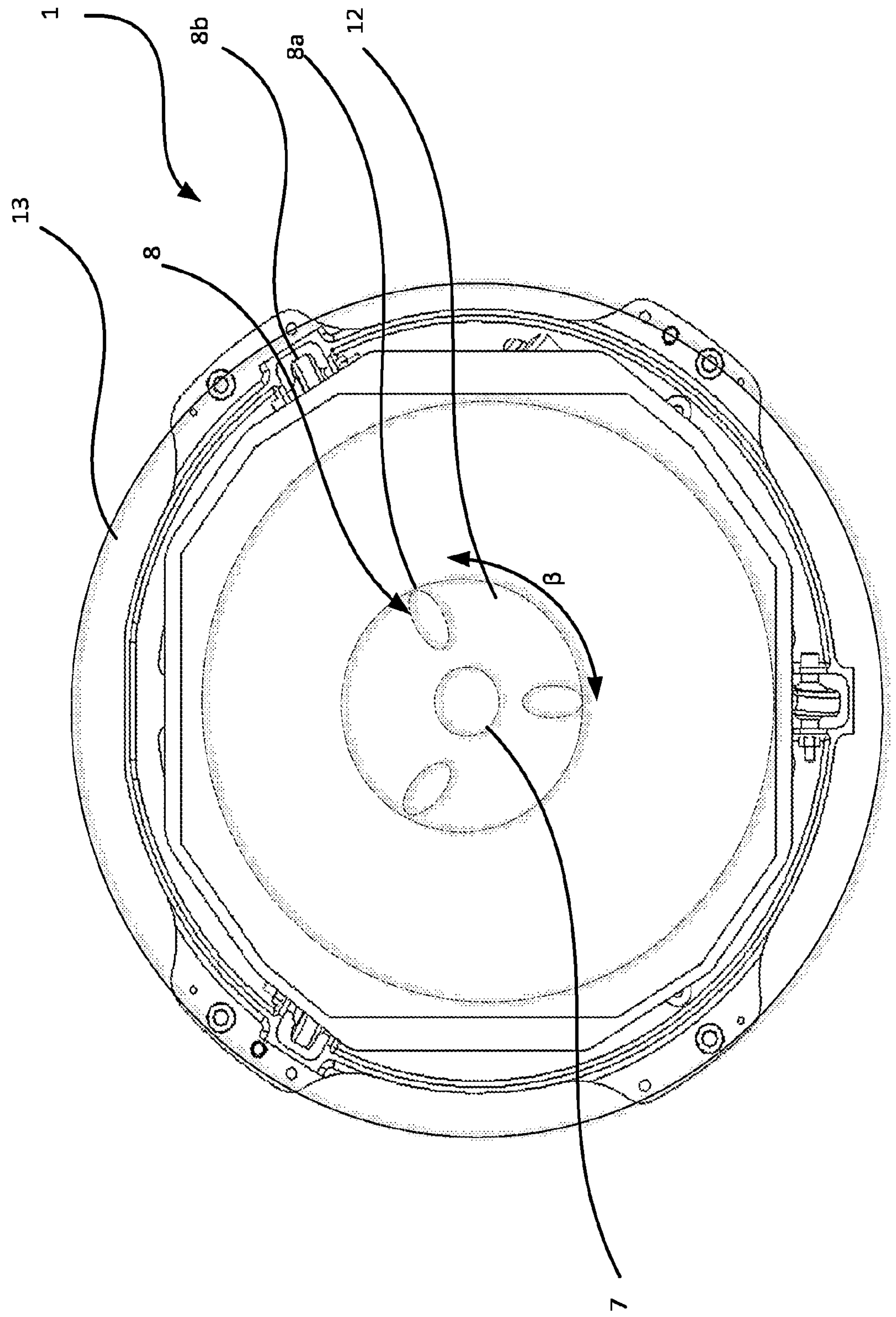
FIG. 3 illustrates from a top-view an antenna platform arrangement in accordance with aspects herein.

FIG. 3 illustrates a top view of (above) said antenna platform arrangement 1, illustrating that each of the rods 8 are attached, at said rod end 8*a*, to an inner perimeter portion 12 (which may be the same as said central portion p1 that is shown in FIGS. 1 and 2 i.e. the terms inner perimeter portion 12 and central portion p1 are interchangeable) of said movable antenna plate 2 and, at said opposing end 8*b* to an outer perimeter portion 13 on said fixed base 5 (the outer perimeter portion 13 may be the same as the edge portion p2, thus being interchangeable with the edge portion p2 as shown in FIG. 2). Moreover, at least two of the rods 8 are spaced apart by an arc angle β of 90-150 degrees, preferably 120 degrees. FIG. 3 illustrates in more detail that the rods 8 jointly surround the shaft 7 (i.e. shaft joints 7*a*, 7*b*).

Figure 4:
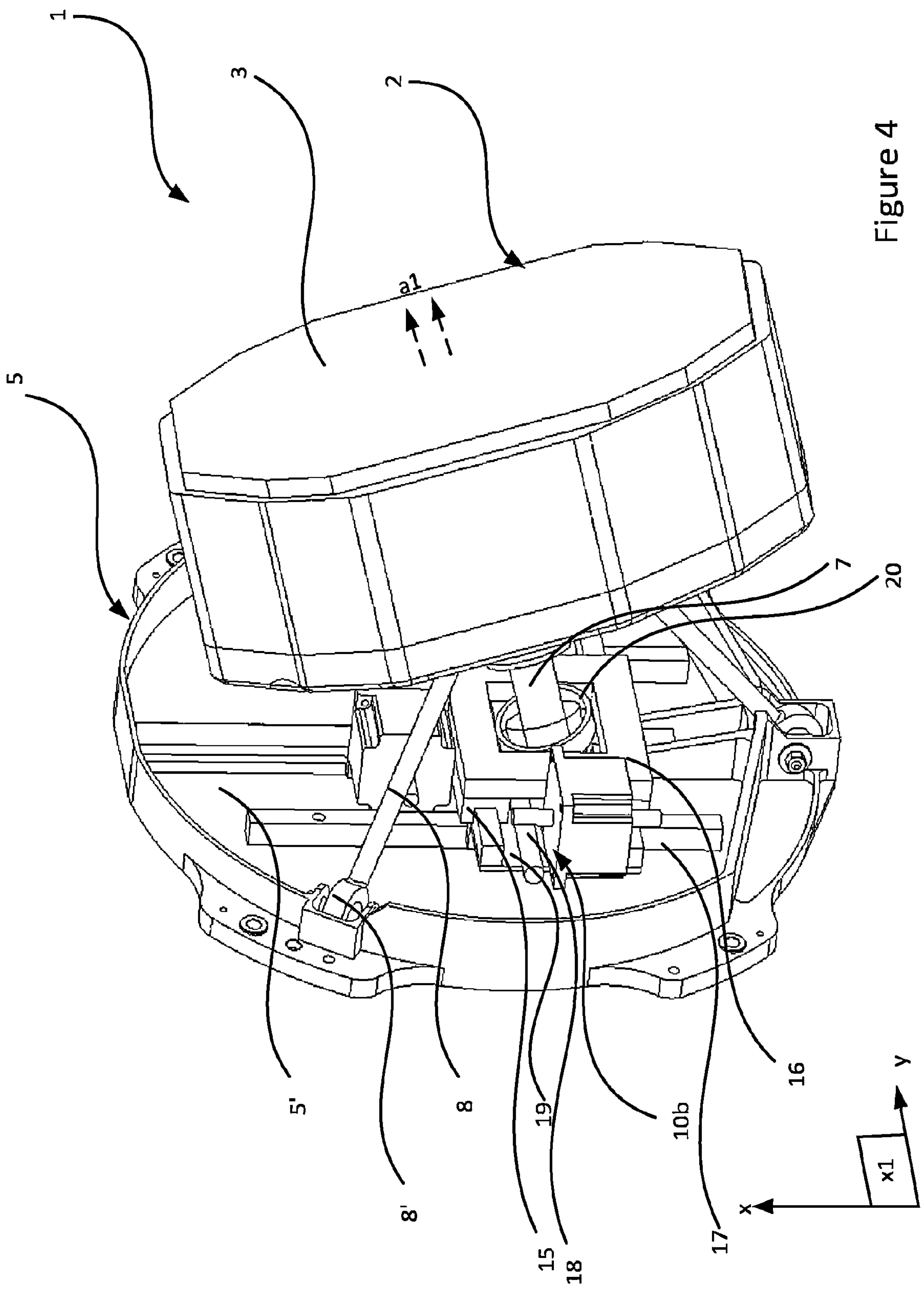
FIG. 4 illustrates from an objective view an antenna platform arrangement in which the movable antenna plate has moved about a conical space.

FIG. 4 illustrates that the actuating means 10 may be an XY-coordinate table extending along a common plane x1 (shown in FIG. 1) as a base surface 5' of the fixed base 5 arranged to provide movement/reciprocation along said base surface 5'. The XY-coordinate table 10*b* may comprise a first driving means 15 and a second driving 16 means, the first and the second driving means 15, 16 being arranged to move/reciprocate linearly, perpendicularly relative each other, e.g. the first driving means 15 may move/reciprocate in an X direction and the second driving means 16 may move in a Y direction along the surface 5' as illustrated in FIG. 4.

The first driving means 15 may move along a first rail 17 which may be provided on said fixed base 5 and the second driving means 16 may move along a second rail 18 (extending perpendicular to said first rail 17) which may be provided on a driving surface 19 positioned on said first driving means 15. The first and the second driving means 15, 16 may be arranged to jointly move said shaft/movable antenna plate so to allow the movable antenna plate about said conical space c0 (shown in FIG. 1). The disclosure is not limited to a rail, the driving means 15, 16 may slide along any suitable type of track. Thus, the term "rail" may be interchanged with track.

The antenna platform arrangement 1 shown in FIG. 4 is shown in a state in which it has been controlled so that a pointing direction a1 of said movable antenna plate 2 is not parallel to said base surface 5'. Further, FIG. 4 illustrates that wherein the coordinate table 10*b* extend along a common plane x1 as a base surface 5' of the fixed base 5 arranged to provide movement along said base surface 5'. The coordinate table 10*b* may be connected to said shaft 7, for example it may have a cavity 20 surrounding said shaft so that any movement forces the shaft to move correspondingly. In other words, the coordinate table 10*b* translates movement performed by the driving means 15, 16 along the plane x1 to said shaft 7, which in turn allows the movable antenna plate 2 to be controlled about said conical space c0.

Figure 5B:
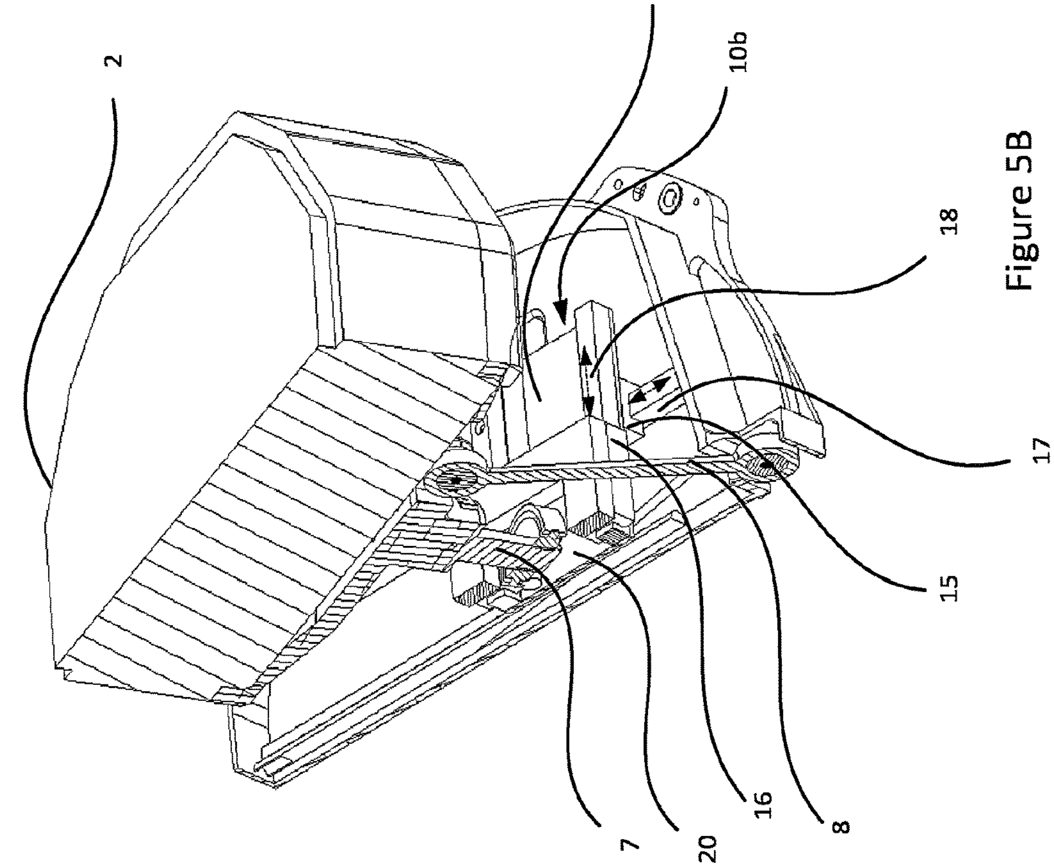
FIG. 5B illustrates from a cross-sectional objective view an antenna platform arrangement in accordance with aspects herein.
Figure 5A:
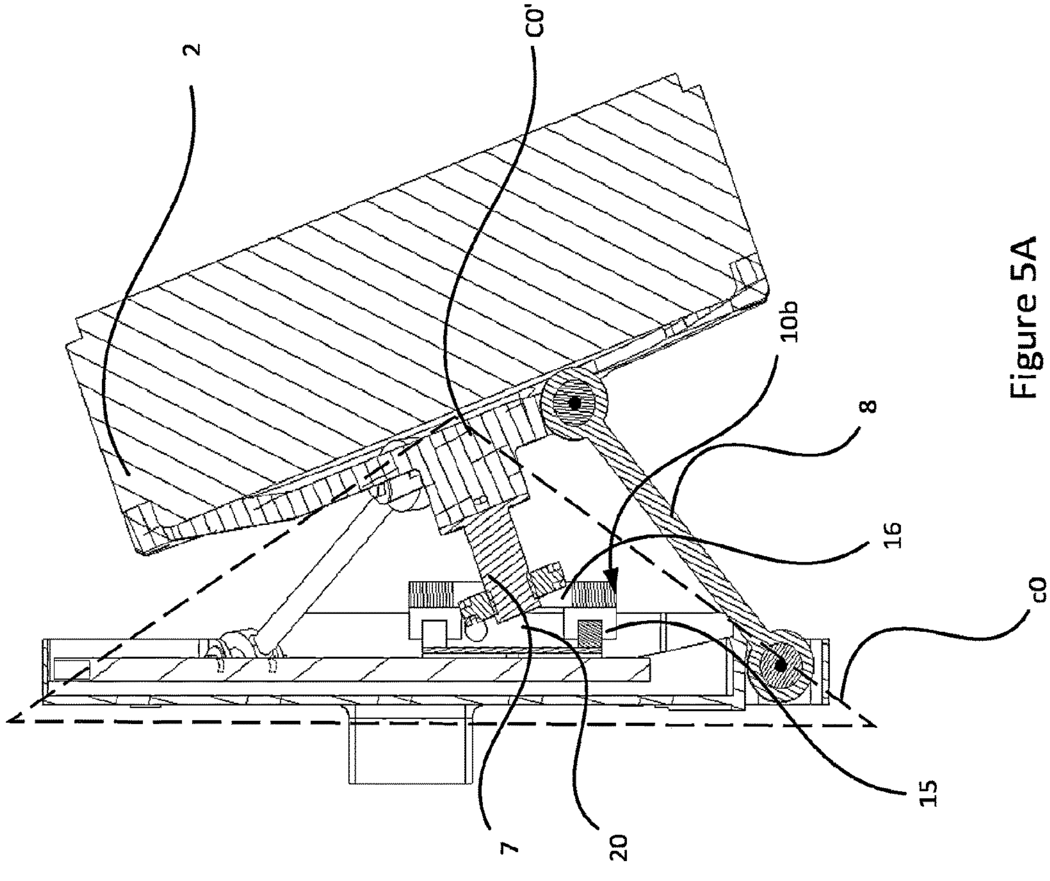
FIG. 5A illustrates from a cross-sectional side view an antenna platform arrangement in accordance with aspects herein.

FIG. 5A illustrates the antenna platform arrangement 1 from a cross-sectional side view in a state in which the movable antenna plate 2 has moved about said conical space c0. Also, the first and the second driving means 15, 16 of the XY-coordinate table 10*b* is illustrated.

FIG. 5B illustrates the antenna platform arrangement 1 from a cross-sectional objective view. FIG. 5B contains arrows on said rails 17, 18 showing illustrating the reciprocating movement that the driving means 15, 16 are configured to perform along the rails 17, 18. The movement of the first and second driving means 15, 16 jointly control the pointing direction of said movable antenna plate 2.

Figure 6A:
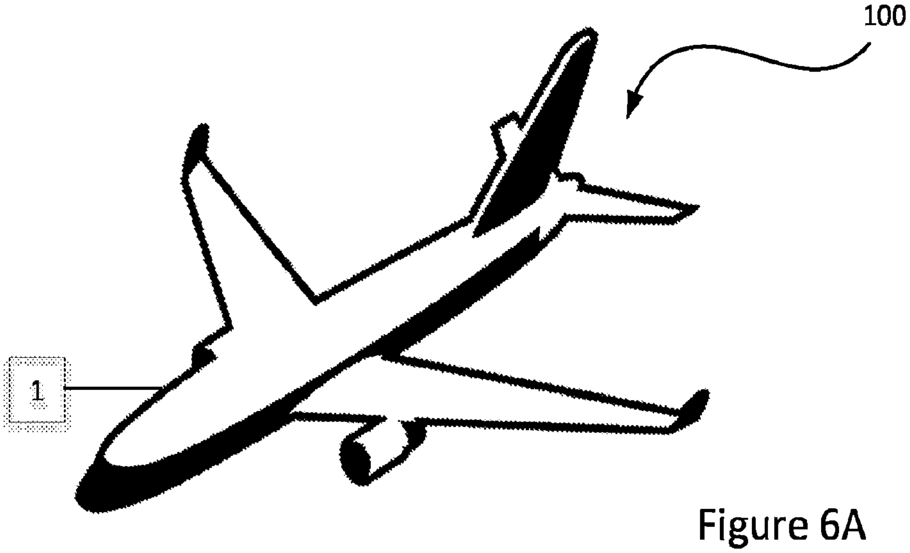
FIG. 6A schematically illustrates a vehicle comprising said antenna platform arrangement.

FIG. 6A schematically illustrates a vehicle 100 comprising the antenna platform arrangement 1 according to any aspect herein. The vehicle in FIG. 6A is an aircraft, however the vehicle may be a ground-vehicle or a ship. In the aspect of the disclosure in which the antenna platform arrangement 1 is arranged in an aircraft, it is preferably arranged in a nose cone of said aircraft.

Figure 6B:
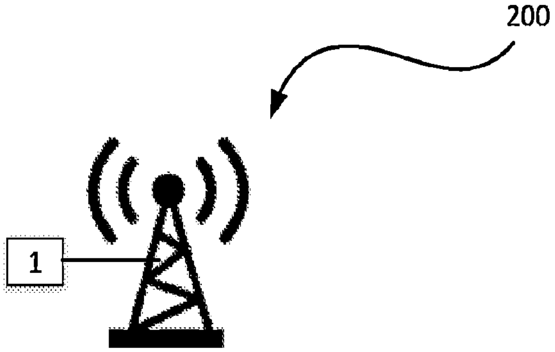
FIG. 6B schematically illustrates a fixed installation comprising said antenna platform arrangement.

FIG. 6B schematically illustrates a fixed installation 200 comprising the antenna platform arrangement according to any aspect herein. The fixed installation may be a base station.

The invention claimed is:

1. An antenna platform arrangement (1) comprising:

a movable antenna plate (2) having an antenna surface (3) and an opposing connection surface (4);

a fixed base (5); and a connection means (6) connecting the connection surface (4) and the fixed base (5), wherein:

said movable antenna plate (2) is associated with an apex (c0') of a conical space (c0) being in-between said fixed base (5) and said movable antenna plate (2), and said connection means (6) is configured to selectively control said movable antenna plate (2) about said conical space (c0), to a pre-determined maximum angle (a) relative a first plane (x1) being parallel with said fixed base (5).

2. The antenna platform arrangement (1) according to claim 1, wherein the connection means (6) comprises:

a shaft (7) comprising a first and a second joint (7*a*, 7*b*) at opposing first ends (7') thereof, at least one of the joints (7*a*, 7*b*) having two degrees of freedom and the other joint having at least one degree of freedom;

three rods (8), each rod (8) comprising a spherical bearing (8') at a rod end (8*a*), and a mechanical joint at an opposing end thereof (8*b*); and at least a first actuating means (10) connected to at least one of the shaft (7) and the movable antenna plate (2);

wherein the shaft (7) extends between respective central portions (p1) of said fixed base (5) and said movable antenna plate (2), the first joint (7*a*) being connected to the movable antenna plate (2) and the second joint (7*b*) being connected to the fixed base (5).

3. The antenna platform arrangement (1) according to claim 2, wherein:

the rod end (8*a*) of each rod (8) is connected to said central portion (p1) of said movable antenna plate (2) jointly surrounding a corresponding first joint (7*a*) of said shaft (7); and the opposing end of each rods (8*b*) is connected to edge portions (p2) of said fixed base jointly surrounding a corresponding second joint (7*b*) of said shaft (7).

4. The antenna platform arrangement according to claim 2, wherein the at least first actuating means (10) is a linear actuator (10*a*) or, a coordinate table (10*b*) being arranged in parallel with said fixed base (5).

5. The antenna platform arrangement according to claim 2, wherein the actuating means is a coordinate table (10*b*) comprising:

a first driving means (15); and a second driving means (16), the first and the second driving means (15, 16) being arranged to move linearly, perpendicularly relative each other.

6. The antenna platform arrangement according to c claim 2, wherein the first actuating means (10) comprises a first and second linear actuator (10*a*) being coupled to a socket (11) slidably connected to said shaft (7);

wherein the first and the second linear actuator (10*a*) are configured to jointly reciprocate, thereby controlling the movable antenna plate (2) about said conical space (c1).

7. The antenna platform arrangement (1) according to claim 2, wherein the shaft (7) is a cardan shaft, wherein at least one of the joints (7*a*, 7*b*) is a cardan joint, preferably, the first and the second joints (7*a*, 7*b*) are cardan joints.

8. The antenna platform arrangement (1) according to claim 2, wherein each of the rods (8) are attached, at said rod end (8*a*), to an inner perimeter portion (12) of said movable antenna plate (2) and, at said opposing end (8*b*) to an outer perimeter portion (13) on said fixed base (5), wherein at least two of the rods (8) are spaced apart by an arc angle (B) of 90-150 degrees, preferably 120 degrees.

9. The antenna platform arrangement (1) according to claim 1, wherein the at least one actuating means (10) extend along a common plane as a base surface (5') of the fixed base (5) arranged to provide movement along said base surface (5').

10. The antenna platform arrangement according to claim 1, wherein the pre-determined maximum angle (a) is 20-40 degrees, preferably 25-35 degrees.

11. The antenna platform arrangement according to claim 1, wherein the antenna platform arrangement (1) comprises control circuitry (30) configured to:

receive a desired position of said movable antenna plate (2) about said conical space (c1); and control said connection means (6) to move the movable plate (2) to said desired position.

12. The antenna platform arrangement (1) according to claim 1, wherein the antenna surface (3) comprises an active electronically scanned array antenna.

13. A vehicle (100) comprising the antenna platform arrangement (1) of claim 1.

14. A fixed installation (200) comprising the antenna platform arrangement (1) of claim 1.

* * * * *